US007158613B2

(12) United States Patent
Dunbar

(10) Patent No.: US 7,158,613 B2
(45) Date of Patent: Jan. 2, 2007

(54) METHOD AND SYSTEM FOR ENABLING CIRCUIT TESTING SERVICES ON A MULTI-SERVICE PROVISIONING PLATFORM

(75) Inventor: Linda L. Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 230 days.

(21) Appl. No.: 10/760,005

(22) Filed: Jan. 16, 2004

(65) Prior Publication Data

US 2005/0157850 A1 Jul. 21, 2005

(51) Int. Cl.
*H04M 1/24* (2006.01)
*H04M 3/08* (2006.01)
*H04M 3/22* (2006.01)
*H04L 1/00* (2006.01)

(52) U.S. Cl. .............................. 379/15.01; 379/27.01; 379/27.06; 370/216; 370/251

(58) Field of Classification Search ............... 379/1.01, 379/9.05, 9.06, 15.03, 17, 19, 22, 26.01, 379/27.01, 27.05, 27.06, 27.07, 28, 29.01, 379/216, 219, 220, 241, 244, 251
See application file for complete search history.

(56) References Cited

U.S. PATENT DOCUMENTS

| 6,873,685 | B1 * | 3/2005 | Chong ...................... 379/27.01 |
| 2002/0191760 | A1 * | 12/2002 | Wattwood et al. ....... 379/93.01 |
| 2003/0157841 | A1 * | 8/2003 | Jun et al. .................... 439/638 |
| 2004/0076166 | A1 * | 4/2004 | Patenaude ................... 370/401 |

\* cited by examiner

*Primary Examiner*—Quoc Tran
(74) *Attorney, Agent, or Firm*—Preston Gates & Ellis LLP

(57) ABSTRACT

A telecommunication multi-service transport platform system is disclosed. It has at least one service card providing a predetermined telecommunication service, and at least one protection card for replacing the service card when the service card fails. The protection card further comprising one or more test ports connectable to an external testing tool, one or more protection circuits, and at least one relay module associated with the test ports for allowing the testing tool to be connected to the protection circuits through at least one test port for testing the service card when the protection card is in a standby mode and for disconnecting the testing tool from the protection circuits when the service card fails.

15 Claims, 4 Drawing Sheets

METHOD AND SYSTEM FOR ENABLING CIRCUIT TESTING SERVICES ON A MULTI-SERVICE PROVISIONING PLATFORM

BACKGROUND OF INVENTION

The present invention relates to telephone networks, and more particularly to a system and method for accessing, monitoring and testing electrical circuits on a telecommunication multi-service transport system.

The telephone industry has changed drastically since the divestiture of the Bell System. Today, several regional Bell Operating Companies (RBOCs) and independent telephone companies provide local telephone service within an excess of 100 Local Access Transport Areas (LATAs). These companies are forced to rely on interexchange carriers such as AT&T, MCI and Sprint for transmission of calls from one LATA to another. The responsibility for quality and performance of the telephone circuit is thus split between local telephone companies and interexchange carriers.

Currently, new technologies and equipment are needed which will allow service providers to rapidly respond to traffic and service needs in the metro environment, while reducing their power consumption, equipment space requirements and overall cost. To this end, several leading equipment vendors have announced new telecommunication provisioning platforms termed Multi-Service Transport Platforms (MSTP) which integrate multiple technologies into a single box replacing older, larger, and less integrated technologies such a Add-Drop multiplexers (ADM) and digital cross connect systems (DCS).

While the MSTP's are advanced, all Network Elements (NE) mentioned above rely on the same Synchronous Optical Network (SONET) and Synchronous Digital Hierarchy (SDH) protocols. While integrating more capabilities and functions into the new telecommunication provisioning platforms such as the MSTP's, the basic low level architecture of the older telecommunication provisioning platforms remains the same in the new MSTP equipment. In particular, the platforms use standardized DS1 and DS3 provisioning line cards interchangeable between several vendor's platforms to aggregate asynchronous analog telephone lines. They also use the traditional service restoration schemes utilizing protection cards (redundant working cards) and fiber ring architecture. As an example, the MSTP's may be connected to SONET/SDH bidirectional line switched rings (BLSR). This type of SONET/SDH architecture delivers scalable, highly reliable ring architecture with dual counter rotating rings delivering two unique paths per pair of interconnected nodes. As there are always two available paths, one is designated as working (active) and the second as the protect (secondary) in standby mode. Similarly in the telecommunication multi-service transport system, there exists a working (active) line card for each DS1 or DS3 circuit as well as a protection card held in a standby mode in case a working card fails and the circuit must be restored. The protection cards may be configured 1:1, one protection card for each working card, or 1:N where there is one protection card for N working cards. Each DSx card is comprised of expensive circuitry which provides an interface between the legacy asynchronous side of the telecommunication network with higher speed synchronous SONET/SDH side of the telecommunication network. Typically each DSx line card includes circuitry for a LIU (line interface unit), a framer, a mapper and bus interface.

DS3 (and to a lesser extent DS1) signals carry large amounts of data per unit time and represent a considerable financial investment on the part of the end user, for whom bandwidth is expensive as it has become for the operating company facility planner. The operating company using DS3 runs the risk of a substantial outage in the case of a crippling impairment or total failure of such high-speed digital facilities. Those who manage the DS3 facilities of both end users and service providers are thus quite interested in the performance of the digital links in their networks. They are not satisfied to let the circuit performance information embedded in the formatted bit streams they deal with simply pass by without extracting data which can be quite useful in managing the network and in minimizing the costly impact of service outages.

To this end, several approaches have been attempted to extract this performance information from the DS1 or DS3 (DSx) signals from the telecommunication multi-service transport system. One test access method entails connecting test equipment to the dedicated DSx test access service ports. The circuit to be tested is then cross connected to the dedicated DSx test access service ports through the STS1 or VT1.5 switching fabric. The drawback to this method is that the dedicated test access service ports are occupying ports which otherwise could carry revenue generating traffic. Secondly, these ports are usually on the rear side of the MSTP equipment making it inconvenient to perform the test access when needed.

A second test access method involves making test access through the central chassis. This method requires the central chassis to have dedicated DSx ports, an extra DSx framer, and extra data bus to pass data from DSx test access ports on the central chassis to the STS1 or VT1.5 switching fabric. This method also requires an extra bus to be connected between the chassis and the switching fabric in order to connect to the chassis ports. The drawback to this method is that it is very expensive due to the extra DSx framer and extra data bus required.

Since an MSTP can function like a mini DCS with transport capability, it is desirable to have test access capability so that electric circuit (e.g., DS1 or DS3 card) tests can be performed. Not only a test access must be provided, it has to be an economical way for providing such a test access using a system which is essentially transparent to in-service DSx lines and paths, thereby providing non-intrusive surveillance and performance monitoring.

Desirable in the art of telephone network designs are additional methods with which better and more economical access, monitoring and testing of telecommunication multi-service transport system can be achieved.

SUMMARY

This disclosure provides a system and method for enabling tests to be performed on arbitrary electric circuits such as DS1 or DS3 circuits on a telecommunication multi-service transport system, such as a multi-service provisioning platform (MSTP), without taking up any service ports or adding any extra hardware such as DS1 or DS3 line cards, framers, mappers, or LIU (Line Interface Unit).

In one example, a telecommunication multi-service transport system is disclosed. It has at least one service card providing a predetermined telecommunication service, and at least one protection card for replacing the service card when the service card fails. The protection card further comprising one or more test ports connectable to an external testing tool, one or more protection circuits, and at least one selection module associated with the test ports for allowing the testing tool to be connected to the protection circuits through at least one test port for testing electric circuits on the service card when the protection card is in a standby mode and for disconnecting the testing tool from the protection circuits when the service card fails.

Various aspects and advantages will become apparent from the following detailed description, taken in conjunction with the accompanying drawings, illustrating the principles of the disclosure by way of examples.

DESCRIPTION

The present disclosure provides an improved system and method for providing test access to telecommunication multi-service transport system, such as a multi-service transport platform (MSTP), without requiring additional service ports or additional support hardware such as DS1 or DS3 line cards, framers mappers or LIU (Line Interface Unit). It is understood by those knowledgeable in the art that telecommunication system platforms may be configured with either DS1 or DS3 line cards, henceforth referred to as DSx. This disclosure provides the test access economically with an expedient, front-panel access design. The telecommunication industry's requirement for test access is met by the utilization of the LIU, framers, mappers, and data bus found on the protection cards resident in the telecommunication multi-service transport system to connect to the STS1/VT1.5 switching fabric providing test access to one or more DSx circuits on the telecommunication system.

Figure 1:
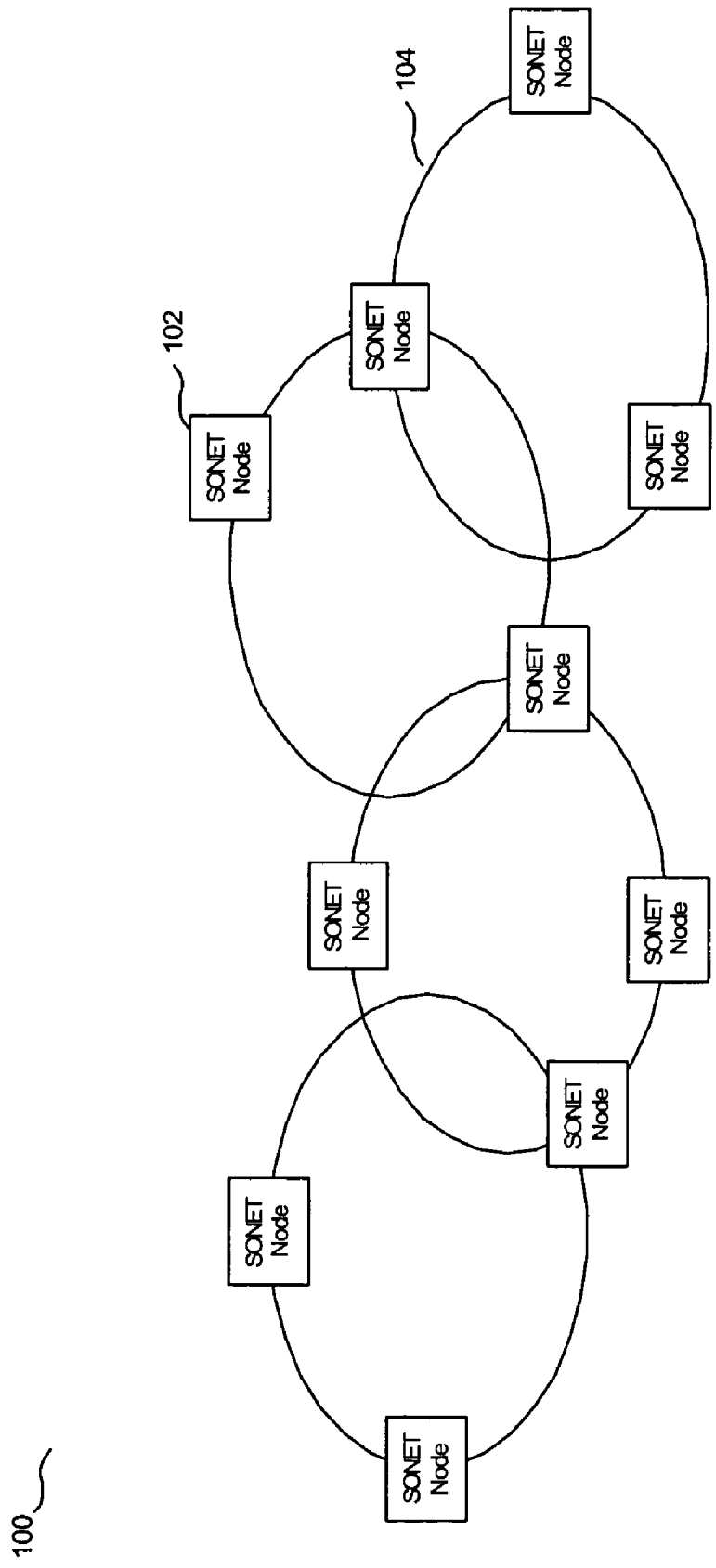
FIG. 1 illustrates a SONET ring layer of a telecommunication network.

FIG. 1 illustrates the SONET ring layer 100 of the telecommunication network which is comprised of Network Elements (NE) 102 and interconnected fiber optic rings 104. The NEs may be SONET terminals, ADMs, DCS, or MSTP platforms.

Figure 2:
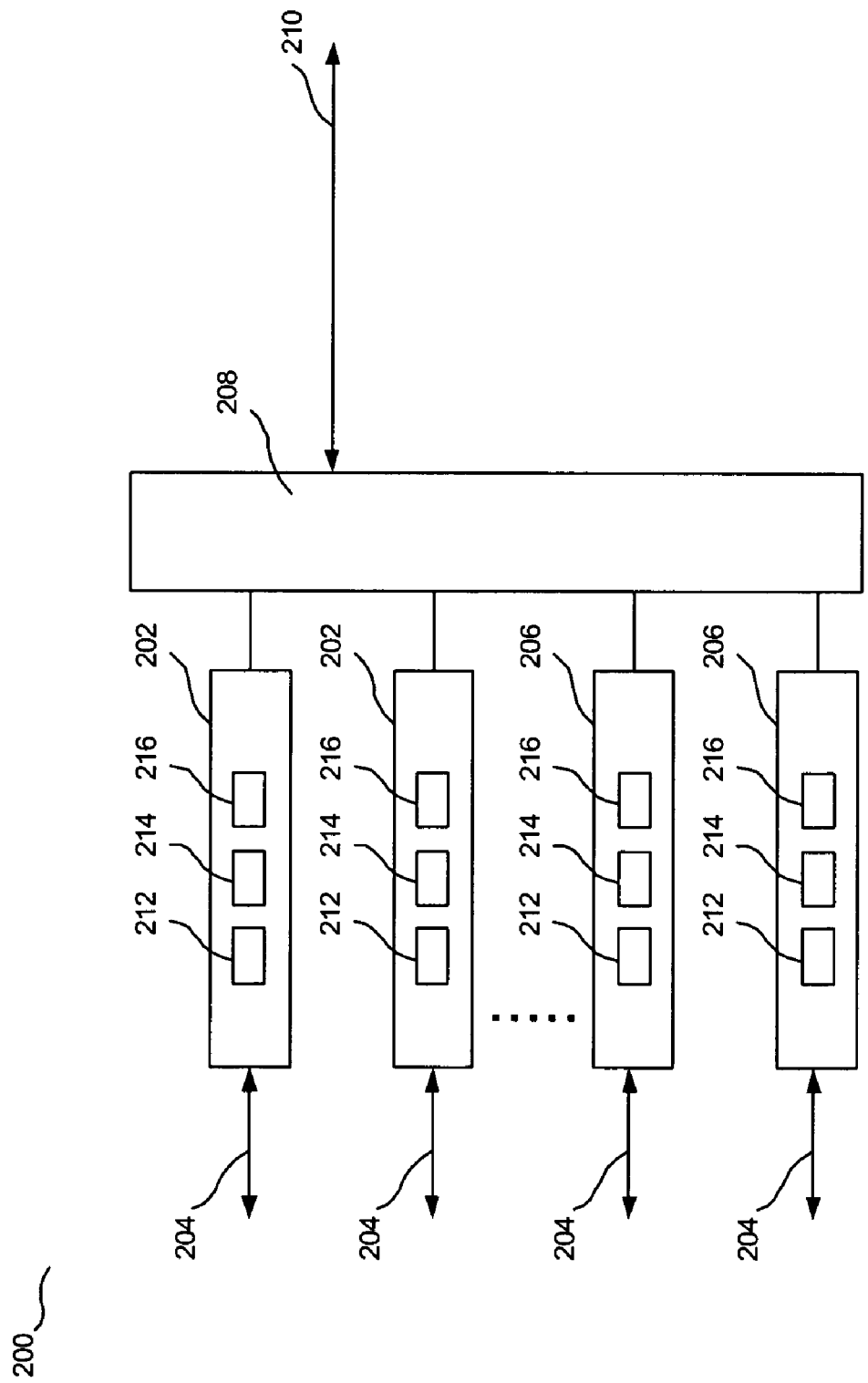
FIG. 2 illustrates the telecommunication provisioning Transport Platform in accordance with an example of the present disclosure.

FIG. 2 illustrates an example of a conventional telecommunication multi-service transport system 200, comprised of at least one DS3 working or service line card 202, at least one DS3 line connection 204, and at least one DS3 protection line card 206 connected to the DS3 working line card 202 through the back plane of the telecommunication provisioning platform 208. Each DS3 working line card 204 and each DS3 protection card 206 is comprised of at least one framer 212, one mapper 214 and one LIU 216. Also connecting into the telecommunication provisioning platform back plane is a telecom bus 210. In one embodiment, telecommunication multi-service transport system 200 is a multi-service provisioning platform (MSTP) and the telecom bus 210 is a 622.080 Mbps STS-12 line. The telecom bus can also be a 622.08 Mbps OC-12 line or similar high bandwidth bus connected to the SONET ring layer 104.

Figure 3:
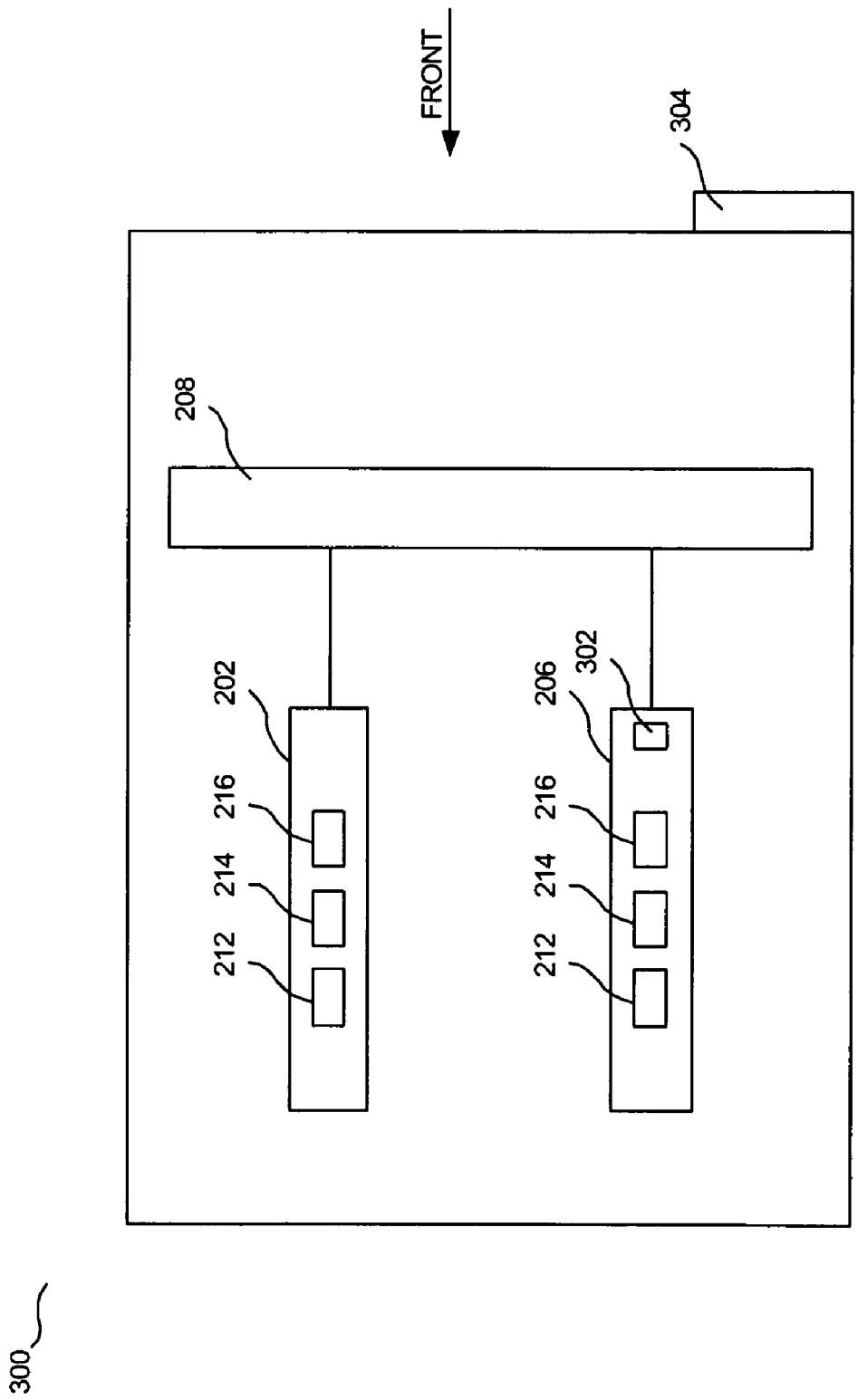
FIG. 3 illustrates a multi-service provisioning Transport Platform with test access in accordance with an example of the present disclosure.

FIG. 3 illustrates an improved MSTP in one example of the present disclosure. The test access enabled MSTP platform 300 is comprised of a multi-service provisioning platform 200 containing at least one working DS3 line card 202, at least one DS3 protection card 206, at least one selection module such as a relay 302, and at least one test access port (TAP) 304. The protection card 206 is connected to the MSTP system as in FIG. 2, however, a relay 302 is connected in the network between the MSTP 208 and the protection card 206. The relay 302 and the DS3 protection card 206 forms the TAP enabled DS3 protection card 306. Central to the provisioning of the test access is the relay 302 which when switched from a standby status to a test access status enables the test access ports for testing the DS3 circuits in the multi-service provisioning platform. As those skilled in the art readily understand, this relay 302 may exist on the protection card, or it may be integrated in the MSTP. It is also understood that regardless of the method employed to provide a relay function (software or hardware), the test access enabled protection card may be accessed through TAP 304 and by a software command and/or manual switch depending on the requirements of the user.

There exist a plurality of methods to activate the test access port and the protection card on the MSTP. In one embodiment, the TAP may be activated by the MSTP sensing the presence of the test instrumentation connected to the port. Also, the test port may be enabled when the protection card is initially inserted in a protection slot of the MSTP. In a second embodiment, the TAP may be activated by a computer configured as an access terminal through its connection with the testing equipment that is coupled to the test access port. In a third embodiment, a panel mounted mechanical switch may be configured and used to change the state of the protection card to the test access status if the protection card is in the standby status. Once a testing equipment is coupled to TAP 304, a testing technician can operate the protection card 206 through various means including using commands of the regular operating system of the MSTP.

Once relay 302 is switched to a test access mode, the relay enables the test access port 304 connected to the MSTP system 200. This test access port may be located on the front of the protection card 306 which faces the front of the multi-service provisioning platform 300. The test access port can be of a standard port component such as a port made by Weco Products (DS3 connectors such as standard BNC or Weco). The TAP may also be located in any convenient location on the front panel of the MSTP which serves the needs of the testing technicians. It is generally understood that rear access to the rack mounted protection cards and working cards is less desirable than front access and it is advantageous to locate test ports for front panel access. In addition, the TAP may have a plurality of connector, port, indicator lights or power configurations depending on the requirements of MSTP administrator for further enhancing the function of the TAP.

Figure 4:
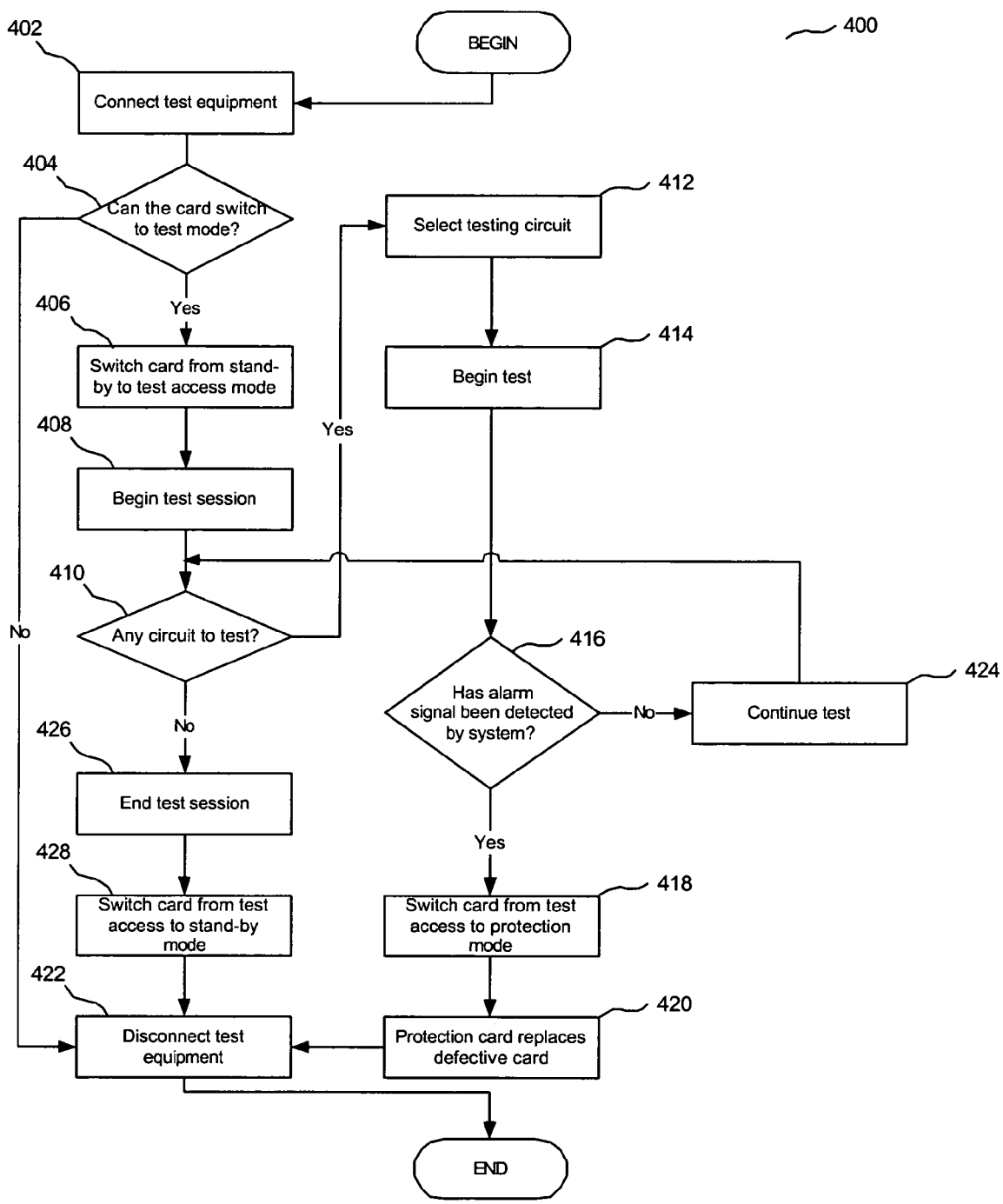
FIG. 4 features an operational flow chart detailing the steps for utilizing a MSTP with test access in accordance with an example of the present disclosure.

FIG. 4 depicts a flow chart 400 of one particular implementation of the inventive concept. Beginning with step 402, a technician connects a suite of external test and control equipment to the test access port. Utilizing a laptop access terminal to connect with the SONET supervisory software, the technician requests test access to a selected protection line card. In step 404, the supervisory software checks to see if the protection card is in the standby status and, if so, it switches the relay to test access status connecting the TAP to the protection card's service ports as shown in process block 406. Next, the technician begins to set up for a test session for one or more DS3 circuits in step 408.

However, in the case where the supervisory software finds the requested protection card is in use, replacing the function of a defective working card, the system will instead deny access to the protection card, leading to step 422 in which the technician ends his testing and removes his test equipment pending the replacement of the defective DS3 working line card.

Provided that the protection card is in the normal standby status and the technician decides to test a DS3 circuit, the technician proceeds through steps 410 and 412 to select the DS3 circuit for testing. The technician begins testing the working DS3 circuits in step 414 utilizing the service ports and bus on the protection card to connect with the service ports on the selected working DS3 line card. As the technician begins testing the selected circuit in step 414, the supervisory software continues to perform its normal surveillance of the MSTP working line cards associated with the protection card for alarms and error conditions during the test access period, step 416.

If a problem is detected with any working card 202, the supervisory software will immediately switch the relay from the test access status to the active protection status, in step 418, to allow the protection card 306 to replace the identified defective DS3 working line card and restore line traffic in step 420. Again, it follows that the technician ends his testing and removes his test equipment, step 422, pending the replacement of the defective DS3 working line card in the MSTP platform.

Provided that no alarm or error conditions cause the relay to switch from the test access status to the active protection status, the technician will continue to test his selected circuit in step 424, until he is finished at which point he can further choose other cards to test, step 410. If there are additional DS3 circuits to test, the service technician repeats the process. Otherwise he proceeds onto step 426 to end his testing and on to step 428 to switch the relay back to its normal standby status and finally to step 422 to disconnect his equipment.

The above disclosure provides many different embodiments, or examples, for implementing different features of the disclosure. Specific examples of components, and processes are described to help clarify the disclosure. These are, of course, merely examples and are not intended to limit the disclosure from that described in the claims.

Although illustrative embodiments of the disclosure have been shown and described, other modifications, changes, and substitutions are intended in the foregoing disclosure. Accordingly, it is appropriate that the appended claims be construed broadly and in a manner consistent with the scope of the disclosure, as set forth in the following claims.

What is claimed is:

1. A telecommunication multi-service transport system comprising:
    at least one service card providing a predetermined telecommunication service; and
    at least one protection card for replacing the service card when the service card fails, the protection card further comprising:
        one or more test ports connectable to an external testing tool;
        one or more protection circuits; and
        at least one selection module associated with the test ports for allowing the testing tool to be connected to the protection circuits through at least one test port for testing the service card when the protection card is in a standby mode and for disconnecting the testing tool from the protection circuits when the service card fails,
    wherein the selection module is integrally embedded on a single protection card that is capable of replacing the service card when the service card fails.

2. The telecommunication multi-service transport system of claim 1 wherein the switch module uses a service port of the protection card to communicate with the service card for testing purposes.

3. The telecommunication multi-service transport system of claim 1 wherein the service card is a DS3 or DS1 line card.

4. The telecommunication multi-service transport system of claim 3 wherein the protection circuits includes a DS3 framer and an LIU.

5. The telecommunication multi-service transport system of claim 1 further comprising means for enabling the test ports when the protection card is inserted in a protection slot of the telecommunication multi-service transport system.

6. The telecommunication multi-service transport system of claim 1 wherein the test ports are located on the front side thereof.

7. A multi-service transport platform (MSTP) comprising:
    at least one working card slot receiving a service card, the service card having at least one service port carrying data traffic; and
    at least one protection card slot receiving a protection card for replacing functions provided by the service card when the service card fails, the protection card further comprising
        at least one test port connectable to an external testing tool;
        one or more protection circuits connectable to the service port of the service card and connectable to the testing tool through the test port; and
        a relay module associated with the test port allowing the testing tool to be connected to the protection circuits and in communication with the service card when the protection card is in a standby mode for testing the service card,
    wherein the relay module is integrally embedded on a single protection card that is capable of replacing the service card when the service card fails.

8. The MSTP of claim 7 wherein the service card is DS3 or DS1 line card.

9. The MSTP of claim 7 wherein the test port is accessible from the front side of the MSTP.

10. The MSTP of claim 7 wherein the testing tool connected to the relay module communicates with the service card through at least one service port of the protection card.

11. The MSTP of claim 7 further comprising means for enabling the test port when the protection card is inserted in the protection slot of the telecommunication equipment.

12. A protection card used in a multi-service provisioning platform (MSTP) comprising:
    at least one test port connectable to an external testing tool;
    one or more protection circuits connectable to a service port of a service card of the MSTP and connectable to the testing tool through the test port; and
    a relay module integrally embedded on the protection card and associated with the test port allowing the testing tool to be connected to the protection circuits for testing the service card by accessing the service port of the service card through a service port of the protection card when the protection card is in a standby mode,
    wherein the protection card replaces the service card when the testing indicates that the service card fails.

13. The protection card of claim 12 wherein the service card is DS3 or DS1 line card.

14. The protection card of claim 12 wherein the test port is accessible from the front side of the MSTP.

15. The protection card of claim 12 wherein the test port is a Weco port.

* * * * *